US011847351B2

(12) United States Patent
McCarthy et al.

(10) Patent No.: US 11,847,351 B2
(45) Date of Patent: Dec. 19, 2023

(54) AUTOMATIC IDENTIFICATION AND RANKING OF MIGRATION CANDIDATE STORAGE GROUPS BASED ON RELATIVE PERFORMANCE IMPACT TO CURRENT STORAGE ARRAY COMPONENTS

(71) Applicant: Dell Products L.P., Hopkinton, MA (US)

(72) Inventors: Jason McCarthy, Cambridge, MA (US); Girish Warrier, Natick, MA (US); Rongnong Zhou, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 35 days.

(21) Appl. No.: 17/560,347

(22) Filed: Dec. 23, 2021

(65) Prior Publication Data

US 2023/0205454 A1  Jun. 29, 2023

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0635* (2013.01); *G06F 3/0647* (2013.01); *G06F 3/0653* (2013.01)

(58) Field of Classification Search
CPC .... G06F 3/0659; G06F 3/0604; G06F 3/0635; G06F 3/0647; G06F 3/0653; G06F 3/067
See application file for complete search history.

(56) References Cited

U.S. PATENT DOCUMENTS

| | | | |
|---|---|---|---|
| 10,656,869 B1 * | 5/2020 | Greenwood | ........ G06F 11/3034 |
| 2002/0194326 A1 * | 12/2002 | Gold | ..................... G06F 11/008 |
| | | | 709/224 |
| 2015/0026430 A1 * | 1/2015 | Paterson-Jones | ..... G06F 3/0608 |
| | | | 711/171 |

* cited by examiner

*Primary Examiner* — Michelle T Bechtold
(74) *Attorney, Agent, or Firm* — Anderson Gorecki LLP

(57) ABSTRACT

Storage object groups uniquely associated with respective host applications are processed to model, for each host application, the relationship between current utilized storage capacity of each host application and greatest possible utilized storage capacity of each host application without exhausting either the storage capacity of the storage system or the performance capacity of the storage system. The modeled relationships may be used to calculate headroom and performance impact scores for each host application. Storage object groups that have insufficient headroom for growth, e.g., as indicated by performance impact score, are deemed to be associated with host application workloads that are candidates for migration to a different storage system. The candidates may be ranked and selected for migration based on performance impact scores.

20 Claims, 3 Drawing Sheets

AUTOMATIC IDENTIFICATION AND RANKING OF MIGRATION CANDIDATE STORAGE GROUPS BASED ON RELATIVE PERFORMANCE IMPACT TO CURRENT STORAGE ARRAY COMPONENTS

TECHNICAL FIELD

The subject matter of this disclosure is generally related to data storage systems, and more particularly to migration of stored data.

BACKGROUND

A data center typically includes clusters of host servers and data storage systems that maintain host application data. Each host server may simultaneously support multiple instances of one or more of the host applications that support services such as email, sales, accounting, inventory control, manufacturing control, and a wide variety of other organizational functions. Examples of data storage systems include storage area networks (SANs), storage arrays, network-attached storage (NAS), and a variety of other storage architectures. The number of host servers and the storage capacity of the storage systems may be increased to accommodate increased demand for computing and storage capabilities. However, it can be difficult to determine when and how to redistribute stored data to avoid performance problems.

SUMMARY

A method implemented by a storage system configured to maintain data used by a plurality of applications running on a plurality of servers in accordance with some implementations comprises: calculating a performance impact score for each one of the plurality of applications, each performance impact score representing a relationship between current utilized storage capacity of the respective application and greatest possible utilized storage capacity of the respective application without exhausting at least one of storage capacity of the storage system and performance capacity of the storage system; and prompting an action on data used by a selected one of the plurality of applications based on comparison of the performance impact scores.

An apparatus in accordance with some implementations comprises: at least one compute node configured to maintain data used by a plurality of applications running on a plurality of servers; and a performance impact modeler configured to: calculate a performance impact score for each one of the plurality of applications, each performance impact score representing a relationship between current utilized storage capacity of the respective application and greatest possible utilized storage capacity of the respective application without exhausting at least one of storage capacity of the storage system and performance capacity of the storage system, and prompt an action on data used by a selected one of the plurality of applications based on comparison of the performance impact scores.

In accordance with some implementations, a non-transitory computer-readable storage medium stores instructions that when executed by a storage system cause the storage system to perform a method for migrating a host application workload to a different storage system, the method comprising: calculating a performance impact score for each one of the plurality of applications, each performance impact score representing a relationship between current utilized storage capacity of the respective application and greatest possible utilized storage capacity of the respective application without exhausting at least one of storage capacity of the storage system and performance capacity of the storage system; and prompting an action on data used by a selected one of the plurality of applications based on comparison of the performance impact scores.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
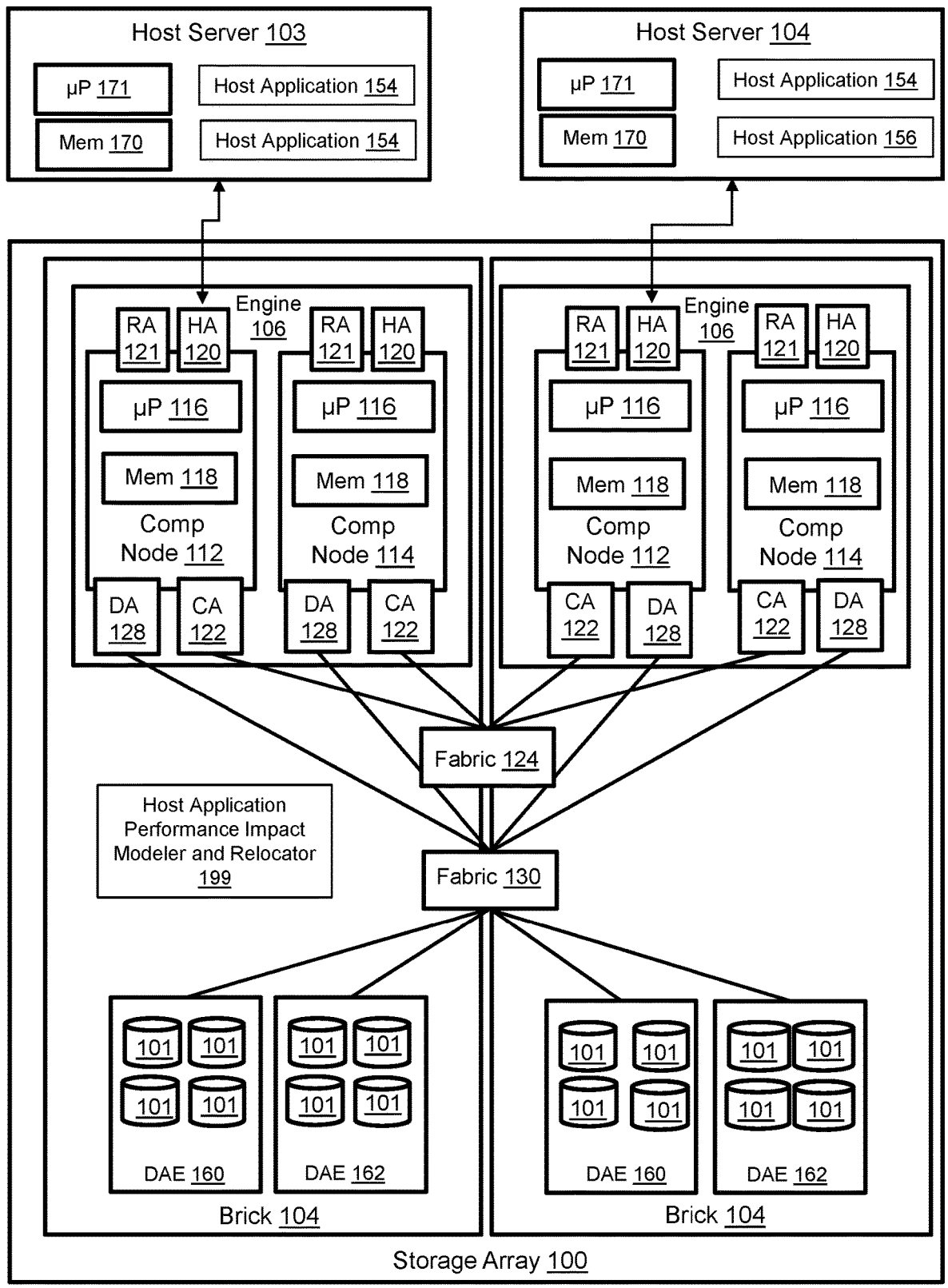
FIG. 1 illustrates a simplified data center environment with host servers and a storage array with a host application performance impact modeler and relocator.

FIG. 1 illustrates a simplified data center environment with host servers 103, 104 and a storage array 100 with a host application performance impact modeler and relocator 199. The host application performance impact modeler and relocator models correlations between utilized storage capacity and workload for each host application that utilizes the storage array. The modelled correlations may be used to generate performance impact scores that represent the relationship between current utilized storage capacity of the respective application and greatest possible utilized storage capacity of the respective application without exhausting at least one of storage capacity of the storage system and performance capacity of the storage system. The modelled correlations may also or alternatively be used to generate negative performance impact scores that represent potential performance capacity savings by migrating a host application workload off of the storage array. The host application performance impact modeler and relocator may suggest an action, such as migration of a host application workload, based on comparison of the scores of different host applications. Those of ordinary skill in the art will recognize that the storage array would typically support more than two host servers and the data center could include multiple storage arrays. Nevertheless, the techniques and features disclosed herein are applicable to such larger scale implementations.

The host servers 103, 104 include volatile memory 170 and one or more tangible processors 171. The memory and processors are used to run instances of host applications 154, 156. Host application instances may run on virtual machines under a hypervisor or in containers. An individual host server may simultaneously support instances of a single host application or instances of multiple host applications. In the illustrated example, host server 103 runs instances of host application 154 and host server 104 runs instances of host applications 154 and 156. Instances of host applications prompt generation of input-output commands (IOs) to read and/or write host application data that is maintained by the storage array 100.

The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the host servers 103, 104 from the compute nodes 112, 114. Nevertheless, the host applications could run on the compute nodes. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., including one or more types such as solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A back-end connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
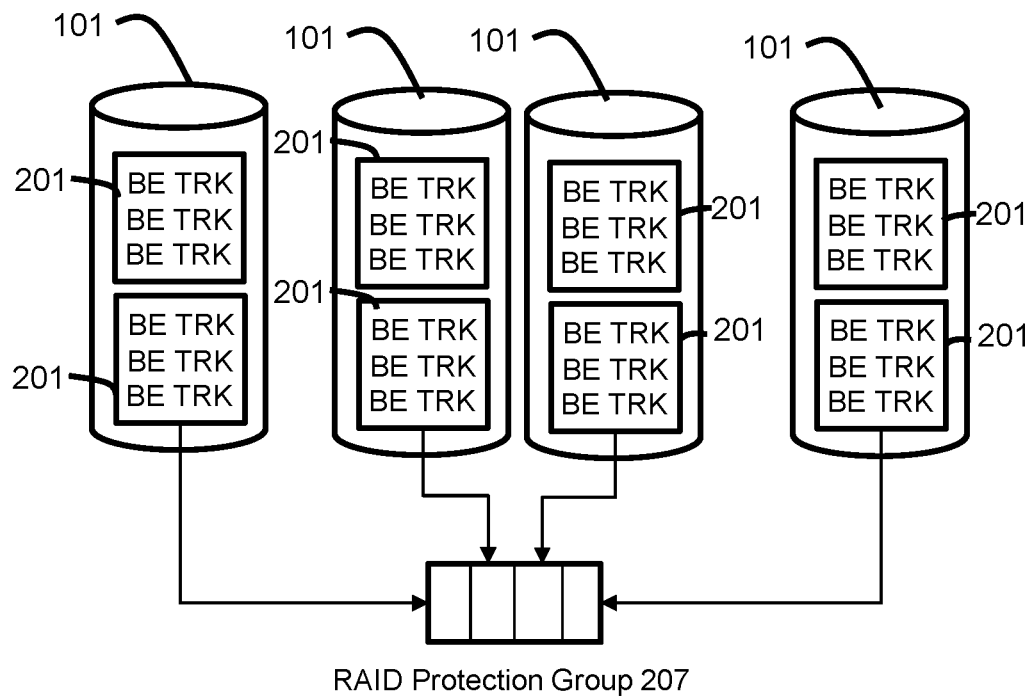
FIG. 2 illustrates how host application data is stored relative to layers of abstraction between managed drives and storage objects.
Figure 2:
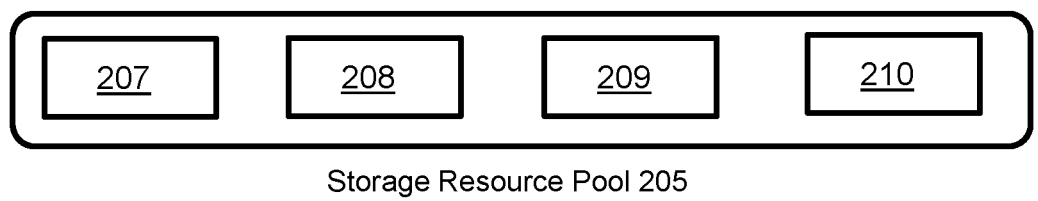
Figure 2:
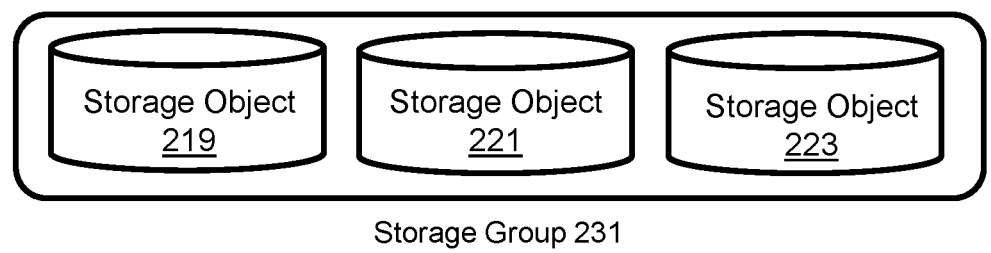
Figure 2:

Referring to FIGS. 1 and 2, the host application data is maintained on the managed drives 101 of the storage array 100 but the managed drives are not discoverable by the host servers 103, 104. To make the host application data accessible to the host servers, the storage array 100 creates logical storage objects that can be discovered by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., production volume. From the perspective of the host servers 103, 104, each production storage object 219, 221, 223, 225, 227, 229 is a single disk having a set of contiguous fixed-size logical block addresses (LBAs) on which data used by the instances of a host application resides. However, the host application data is stored at non-contiguous addresses on various managed drives 101. Separate storage groups 231, 233 of production storage objects 219, 221, 223 and 225, 227, 229 may be created for each host application 154, 156, respectively. Multiple instances of a single host application may use data from the same storage group, but instances of different host applications do not use data from the same storage group. Consequently, storage groups can be used to represent host applications in workload and storage capacity utilization calculations.

The compute nodes 112, 114 maintain metadata that maps between the LBAs of the production storage objects 219, 221, 223, 225, 227, 229 and physical addresses on the managed drives 101 in order to process IOs from the host servers. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects 219, 221, 223, 225, 227, 229. The host application data is logically stored in front-end tracks (FE TRKs), that may be referred to as blocks, on the production storage objects and the FE TRKs are mapped to BE TRKs on the managed drives by the metadata.

Figure 3:
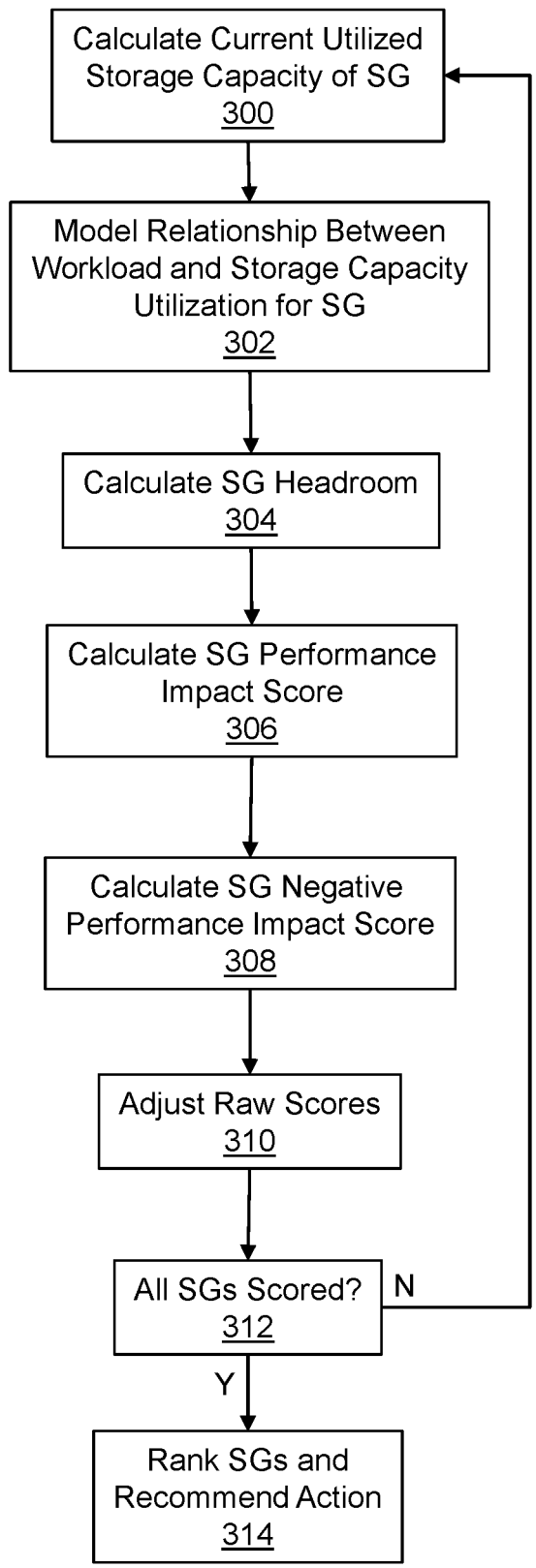
FIG. 3 illustrates a method for automatic identification and ranking of migration candidate storage groups based on relative performance impact to current storage array components.

FIG. 3 illustrates a method for automatic identification and ranking of migration candidate storage groups based on relative performance impact to current storage array components, where each storage group represents a host application workload. Step 300 is selecting a storage group maintained by the storage array and calculating the currently utilized storage capacity of that storage group. The storage objects in the storage group may be thinly provisioned, and the data may be deduped and/or compressed, so the metadata in the shared memory may be scanned to determine how much actual back-end storage capacity on the managed drives is utilized by each storage object. The utilized storage capacity of the storage objects of the storage group may be summed to calculate the currently utilized storage capacity of the storage group. Because the storage group is uniquely associated with one of the host applications, the currently utilized storage capacity of the storage group is also the currently utilized storage capacity of all instances of that host application.

Step 302 is modelling the relationship between workload and storage capacity utilization for the storage group. The relationship may be modeled based on one or more of current, historical, and projected future pairings of workload in IOPS and storage capacity utilization in TB of the storage group, for example, and without limitation. In a specific implementation, two weeks of key performance index (KPI) values associated with workload and storage capacity utilization of a selected storage group recorded at 5-minute intervals may be placed in 42 temporal buckets that represent regular time intervals over the two-week period. The bucketed information may be processed in accordance with any of a variety of techniques, e.g., averaged, weighted, weighted and averaged, and max or min weighted/unweighted values representing worst or best cases may be selected as representative. The modelled relationship may mathematically indicate expected IOPS as a function of storage capacity utilization in TB.

Step 304 is calculating a headroom value of the storage group. The headroom is the amount of additional utilized storage capacity in TB that can be added to the storage group without exceeding either the storage capacity of the storage array or the performance capacity of the storage array. The total performance capacity of the storage array may be known, and the headroom may represent the amount of currently unused performance capacity that could be used by the storage group at the current workload of the storage group without exceeding available storage capacity. A storage group that has insufficient headroom may be flagged as a candidate for migration, as will be explained below.

Calculating the available additional performance capacity of the storage array may include accounting for a mix of drive types. For example, all drives of a same-drive all flash storage array may be considered to have the same IO latency performance characteristics, but in a storage array that includes both flash drives and spinning disk drives the IO latency performance of the spinning disk drives may be greater than the IO latency of the flash drives. In some implementations the utilized and additional storage capacity of is modelled as being placed on the managed drives in order of increasing IO latency performance to represent the change in performance capacity as more of the storage capacity of the storage array is utilized. The performance capacity calculation may also account for the service level assigned to the storage group. For example, if the storage group is assigned a service level that requires max IO latency X, and the SSD and HDD managed drives exhibit IO latencies Y and Z, respectively, then the performance capacity of the storage array is modelled as a function of X, Y, and Z.

Step 306 is calculating a storage group performance impact score. The performance impact score represents the relationship between current utilized storage capacity of the storage group and greatest possible utilized storage capacity of the storage group at the current workload without exhausting at least one of storage capacity of the storage system and performance capacity of the storage system. Algorithmically, storage group performance impact=capacity/(capacity+headroom)*100.0, where "capacity" is the storage capacity of the storage group and "headroom" is the value calculated as described above. IO distribution and IO density of the storage group across front-end resources such as ports and host adapters is maintained, but scaled to a new capacity in the calculation. A performance impact score at or near 100% indicates that the storage group has no room to grow without reaching a performance or storage threshold, and thus may be a good candidate to migrate off the storage array. A low performance impact score indicates that the storage group has room to grow or be duplicated. Thus, the associated host application workload is not a good candidate for migration and can remain on the storage array.

Step 308 is calculating a negative performance impact score of the storage group. The negative performance impact score indicates potential storage array performance capacity that would be made available by migrating the storage group (host application workload) off of the storage array, e.g., to a less heavily loaded storage array. The negative performance impact score may facilitate selection of a suitable target storage array for migration of a storage group selected on the basis of the performance impact score. More specifically, only storage arrays with sufficient available performance capacity greater than indicated by the negative performance impact score may be considered as migration targets.

Step 310 is adjusting the raw headroom, performance impact, and negative performance impact scores. The adjustments, which are optional, would negate or otherwise resolve the influence of front-end limitations on the raw scores. Front-end limitations may include host adapter and port influence on performance. For example, as a result of port selection the workload associated with the storage group may be supported by a single engine, thereby creating an unbalanced loading of the available engines. The raw scores may be adjusted by simulating front-end-specific remediation to indicate what the scores would be if the workload was balanced on the front-end, e.g., by utilizing more and/or different ports.

Step 312 is determining whether all storage groups of the storage array have been scored. If step 312 evaluates in the negative, then the next storage group is selected and steps 300 through 312 are repeated. If step 312 evaluates in the positive, then flow proceeds to step 314 in which the storage groups are ranked based on scores and actions are optionally recommended. The storage groups may be ranked based on the performance impact scores. A migration candidate may be selected based on having the greatest performance impact score. A migration action may be recommended or prompted on the basis of the scores, e.g., selecting a target storage array that can accommodate the additional workload indicated by the negative performance impact score and storage capacity utilization with enough headroom to allow for expected growth.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented by a storage system configured to maintain data used by a plurality of applications running on a plurality of servers, the method comprising:
   at least one tangible processor computing a performance impact score for each one of the plurality of applications, each performance impact score representing a relationship between current utilized storage capacity of the respective application and a maximum utilized storage capacity of the respective application without exhausting at least one of storage capacity of the storage system and performance capacity of the storage system; and
   the at least one tangible processor automatically migrating data that is used by a selected one of the plurality of applications identified based on a comparison of the computed performance impact scores to select the application with a least possibility for growth in terms of the storage capacity of the storage system or the performance capacity of the storage system.

2. The method of claim 1 wherein each one of the plurality of applications utilizes a respective storage group uniquely associated therewith and comprising calculating current utilized storage capacity of each storage group.

3. The method of claim 2 comprising calculating headroom of each storage group, the headroom indicating an amount of additional storage capacity at a selected workload that can be utilized without exhausting at least one of storage capacity of the storage system and performance capacity of the storage system.

4. The method of claim 1 wherein each one of the plurality of applications utilizes an associated storage group uniquely associated therewith and comprising calculating a negative performance impact score of each storage group, the negative performance impact score indicating potential performance capacity savings resulting from migrating the associated storage group out of the storage system.

5. The method of claim 1 comprising adjusting the performance impact score based on front-end performance limitations by simulating front-end-specific remediation.

6. The method of claim 1 comprising calculating separate performance impact scores for each of a plurality of time intervals.

7. The method of claim 6 comprising weighting the separate performance impact scores of the plurality of time intervals and prompting an action on a selected one of the plurality of applications based on the weighted performance impact scores.

8. An apparatus comprising:
   at least one compute node configured to maintain data used by a plurality of applications running on a plurality of servers; and
   at least one tangible processor running a performance impact modeler configured to:
      compute a performance impact score for each one of the plurality of applications, each performance impact score representing a relationship between current utilized storage capacity of the respective application and a maximum utilized storage capacity of the respective application without exhausting at least one of storage capacity of the storage system and performance capacity of the storage system, and
      automatically migrate data that is used by a selected one of the plurality of applications identified based on a comparison of the computed performance impact scores to select the application with a least possibility for growth in terms of the storage capacity of the storage system or the performance capacity of the storage system.

9. The apparatus of claim 8 wherein each one of the plurality of applications utilizes a respective storage group uniquely associated therewith and wherein the performance impact modeler is configured to calculate current utilized storage capacity of each storage group.

10. The apparatus of claim 9 wherein the performance impact modeler is configured to calculate headroom of each storage group, the headroom indicating an amount of additional storage capacity at a selected workload that can be utilized without exhausting at least one of storage capacity of the storage system and performance capacity of the storage system.

11. The apparatus of claim 8 wherein each one of the plurality of applications utilizes an associated storage group uniquely associated therewith and wherein the performance impact modeler is configured to calculate a negative performance impact score of each storage group, the negative performance impact score indicating potential performance capacity savings resulting from migrating the associated storage group out of the storage system.

12. The apparatus of claim 8 wherein the performance impact modeler is configured to adjust the performance impact score based on front-end performance limitations by simulating front-end-specific remediation.

13. The apparatus of claim 8 wherein the performance impact modeler is configured to calculate separate performance impact scores for each of a plurality of time intervals.

14. The apparatus of claim 13 wherein the performance impact modeler is configured to weight the separate performance impact scores of the plurality of time intervals and prompt an action on a selected one of the plurality of applications based on the weighted performance impact scores.

15. A non-transitory computer-readable storage medium storing instructions that when executed by a storage system cause the storage system to perform a method for migrating a host application workload to a different storage system, the method comprising:
   computing a performance impact score for each one of the plurality of applications, each performance impact score representing a relationship between current utilized storage capacity of the respective application and a maximum utilized storage capacity of the respective application without exhausting at least one of storage capacity of the storage system and performance capacity of the storage system; and
   automatically migrating data used by a selected one of the plurality of applications identified based on a comparison of the computed performance impact scores to select the application with a least possibility for growth in terms of the storage capacity of the storage system or the performance capacity of the storage system.

16. The non-transitory computer-readable storage medium of claim 15 wherein each one of the plurality of applications utilizes a respective storage group uniquely associated therewith and the method comprises calculating current utilized storage capacity of each storage group.

17. The non-transitory computer-readable storage medium of claim 16 wherein the method comprises calculating headroom of each storage group, the headroom indicating an amount of additional storage capacity at a selected workload that can be utilized without exhausting at least one of storage capacity of the storage system and performance capacity of the storage system.

18. The non-transitory computer-readable storage medium of claim 15 wherein each one of the plurality of applications utilizes an associated storage group uniquely associated therewith and the method comprises calculating a negative performance impact score of each storage group, the negative performance impact score indicating potential performance capacity savings resulting from migrating the associated storage group out of the storage system.

19. The non-transitory computer-readable storage medium of claim 15 wherein the method comprises adjusting the performance impact score based on front-end performance limitations by simulating front-end-specific remediation.

20. The non-transitory computer-readable storage medium of claim 15 wherein the method comprises calculating separate performance impact scores for each of a plurality of time intervals.

* * * * *